United States Patent
Tsutsumi et al.

(10) Patent No.: US 8,358,024 B2
(45) Date of Patent: Jan. 22, 2013

(54) WIND TURBINE GENERATOR AND TIDAL CURRENT GENERATOR WITH A HYDRAULIC TRANSMISSION

(75) Inventors: Kazuhisa Tsutsumi, Tokyo (JP); Atsushi Maekawa, Tokyo (JP); Masayuki Shimizu, Tokyo (JP); Stephen Salter, Midlothian (GB); Uwe Stein, Midlothian (GB); William Rampen, Midlothian (GB); Robert Fox, Midlothian (GB); Hauke Karstens, London (GB)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/999,030

(22) PCT Filed: Nov. 30, 2010

(86) PCT No.: PCT/JP2010/006977
§ 371 (c)(1),
(2), (4) Date: Feb. 15, 2011

(87) PCT Pub. No.: WO2012/073277
PCT Pub. Date: Jun. 7, 2012

(65) Prior Publication Data
US 2012/0061969 A1    Mar. 15, 2012

(51) Int. Cl.
*F03D 9/00* (2006.01)
(52) U.S. Cl. .......................... 290/44; 290/55
(58) Field of Classification Search .................. 290/44, 290/55, 43, 54; 60/398
See application file for complete search history.

(56) References Cited

U.S. PATENT DOCUMENTS

| | | | | |
|---|---|---|---|---|
| 3,269,121 | A | * | 8/1966 | Bening ............................ 60/398 |
| 4,280,061 | A | * | 7/1981 | Lawson-Tancred ............ 290/55 |
| 4,498,017 | A | * | 2/1985 | Parkins ............................ 290/44 |
| 5,190,446 | A | | 3/1993 | Salter et al. |
| 5,259,738 | A | | 11/1993 | Salter et al. |

(Continued)

FOREIGN PATENT DOCUMENTS
EP    2154368 A2    2/2010
(Continued)

OTHER PUBLICATIONS

Rampen, W. H.S. et al., "Progress on the Development of the Wedding-Cake Digital Hydraulic Pump/Motor", 2nd European Wave Power Conference, Lisbon, Nov. 8-10, 1995, pp. 289-296.

(Continued)

*Primary Examiner* — Tho D Ta
(74) *Attorney, Agent, or Firm* — Kanesaka, Berner & Partners, LLP

(57) ABSTRACT

An object of the present invention is to provide a wind turbine generator and a tidal current generator equipped with a hydraulic transmission with a combination of a hydraulic pump and a hydraulic motor and which has a superior productivity and maintainability. The wind turbine generator 1 has the hydraulic transmission 10 for transmitting the rotation energy of a main shaft 8 to a generator 20. The hydraulic transmission 10 includes a hydraulic pump 12 of variable displacement type which is driven by the main shaft 8, a hydraulic motor 14 of variable displacement type which is connected to the generator 20, and a high pressure oil line and a low pressure oil line which are arranged between the hydraulic pump 12 and the hydraulic motor 14. The hydraulic transmission 10 is at least partially constituted of a plurality of modules (M1 to M7).

17 Claims, 11 Drawing Sheets

U.S. PATENT DOCUMENTS

| | | | |
|---|---|---|---|
| 5,944,493 A | 8/1999 | Albertin et al. | |
| 6,837,141 B1* | 1/2005 | Edelson | 91/491 |
| 8,106,527 B1* | 1/2012 | Carr | 290/54 |
| 2007/0024058 A1 | 2/2007 | McClintic | |
| 2009/0155095 A1 | 6/2009 | Gollner | |
| 2009/0317266 A1 | 12/2009 | Rampen | |
| 2010/0032959 A1 | 2/2010 | Nies | |
| 2010/0040470 A1 | 2/2010 | Nies et al. | |
| 2010/0133817 A1 | 6/2010 | Kinzie et al. | |
| 2011/0142596 A1* | 6/2011 | Nies | 415/13 |
| 2012/0025532 A1* | 2/2012 | Song | 290/53 |
| 2012/0096844 A1* | 4/2012 | Caldwell et al. | 60/327 |

FOREIGN PATENT DOCUMENTS

| | | |
|---|---|---|
| EP | 2151574 A2 | 10/2010 |
| GB | 1003003.9 | 2/2010 |
| GB | 1009013.2 | 5/2010 |
| GB | 1013773.5 | 8/2010 |
| WO | 2007053036 A1 | 5/2007 |
| WO | 2008012587 A2 | 1/2008 |
| WO | 2008113699 A2 | 9/2008 |

OTHER PUBLICATIONS

Salter, S. H., "Proposal for a Large, Vertical-Axis Tidal-Stream Generator with Ring-Cam Hydraulics", Department of Mechanical Engineering, Mayfield Road, University of Edinburgh EH9 3JL, Scotland, Third European Wave Energy Conference, Sep. 30-Oct. 2, 1998, Patras Greece.
Rampen, W. H.S., et al., "Gearless Transmissions for Large Wind-Turbines—The History and Future of Hydraulic Drives", Dewek Bremen, Dec. 2006, pp. 1-9.
Canadian Office Action issued to corresponding Canadian Application No. 2724564 dated Aug. 14, 2012.
International Search Report mailed May 30, 2012.

\* cited by examiner

US 8,358,024 B2

WIND TURBINE GENERATOR AND TIDAL CURRENT GENERATOR WITH A HYDRAULIC TRANSMISSION

RELATED APPLICATIONS

The present application is based on and claims priority from International Application Number PCT/JP2010/006977, filed Nov. 30, 2010, the disclosures of which is hereby incorporated by reference herein in its entirety.

TECHNICAL FIELD

The present invention relates to a wind turbine generator and a tidal current generator which transmit rotation energy of a rotor to a generator via a hydraulic transmission that is a combination of a hydraulic pump and a hydraulic motor.

BACKGROUND ART

In recent years, from a perspective of preserving the environment, it is becoming popular to use a wind turbine generator utilizing wind power and a renewable energy type turbine generator such as a tidal current generator utilizing tidal.

The wind turbine generator among above generators converts motion energy of the wind to the rotation energy of the rotor and further converts the rotation energy of the rotor to electric power by the generator. In a common wind turbine generator, the rotation speed of the rotor is about a few rotations per minute to tens of rotations per minute. Meanwhile, a rated speed of the generator is normally 1500 rpm or 1800 rpm and thus a mechanical gearbox is provided between the rotor and the generator. Specifically, the rotation speed of the rotor is increased to the rated speed of the generator by the gear box and then inputted to the generator.

In recent years, the gear box tends to become heavier and more expensive as the wind turbine generators are getting larger to improve power generation efficiency. Thus, a wind turbine generator equipped with a hydraulic transmission adopting a combination of a hydraulic pump and a hydraulic motor of a variable capacity type is getting much attention.

For instance, Patent Document 1 discloses a wind turbine generator using a hydraulic transmission including a hydraulic pump rotated by a rotor and a hydraulic motor connected to a generator. In the hydraulic transmission of this wind turbine generator, the hydraulic pump and the hydraulic motor are connected via a high pressure reservoir and a low pressure reservoir. By this, the rotation energy of the rotor is transmitted to the generator via the hydraulic transmission. Further, the hydraulic pump is constituted of a plurality of sets of pistons and cylinders, and cams which periodically reciprocate the pistons in the cylinders.

Further, Patent Document 2 describes a wind turbine generator adopting a hydraulic transmission constituted of a hydraulic pump rotated by a rotor, a hydraulic motor connected to a generator, and an operating oil path arranged between the hydraulic pump and the hydraulic motor. In the hydraulic transmission of this wind turbine generator, the hydraulic pump is constituted of a plurality of sets of pistons and cylinders, cams which periodically reciprocate the pistons in the cylinders, and high pressure valves and low pressure valves which opens and closes with the reciprocation of the pistons. By latching the piston near a top dead center, a working chamber surrounded by the cylinder and the piston is disabled, and then the displacement of the hydraulic pump is changed.

CITATION LIST

Patent Literature

PTL 1

US 2010/0032959

PTL 2

US 2010/0040470

SUMMARY OF INVENTION

Technical Problem

To promote the wind turbine generator and the tidal current generator which are referred to as "turbine generator of renewable energy type", it is necessary to reduce power cost equal to or below the power cost of other generation methods such as a thermal power generation and a hydraulic power generation and also to reduce running cost thereof.

To reduce such costs, it is necessary to further improve productivity and ease of maintenance of the wind turbine generator and the tidal current generator. And, the wind turbine generation and the tidal current generator normally varies in specification depending on wind conditions and tide condition at a site or environmental conditions, and thus there are a variety of types of wind turbine generators and the tidal current generators with different outputs. Thus, it is important to efficiently produce various types of wind turbine generators and the tidal current generators of different outputs in order to reduce the generation cost including a production cost.

However, the wind turbine generators proposed in Patent Document 1 and Patent Document 2 use a hydraulic motor having a number of parts such as pistons, cylinders, cams, low pressure valves and high pressure valves and thus, the productivity and the ease of maintenance is not sufficient. And neither of Patent Document 1 and Patent Document 2 discloses a solution to efficiently produce a various types of wind turbine generators with different outputs.

In view of the problems above, an object of the present invention is to provide a wind turbine generator and a tidal current generator which are equipped with a hydraulic transmission with a combination of a hydraulic pump and a hydraulic motor and which has a superior productivity and ease of maintenance.

Solution to Problem

The present invention proposes a wind turbine generator comprising or a tidal current generator: a rotor; a generator which converts rotation energy transmitted from the rotor to electric power; and a hydraulic transmission which transmits the rotation energy of the rotor to the generator, wherein the hydraulic transmission includes: a hydraulic pump of variable displacement type which is driven by the rotor; a hydraulic motor of variable displacement type which is connected to the generator; a high pressure oil line which is arranged between a discharge side of the hydraulic pump and an intake side of the hydraulic motor; and a low pressure oil line which is arranged between an intake side of the hydraulic pump and a discharge side of the hydraulic motor, wherein each of the hydraulic pump and the hydraulic motor of the hydraulic transmission comprises a plurality of working chambers each of which is surrounded by a cylinder and a piston moving slidingly in the cylinder, a cam having a cam surface which is in engagement with the piston, high pressure valves each of which opens and closes a high pressure communication path between each of the working chambers and the high pressure oil line, and low pressure valves each of which opens and closes a low pressure communication path between each of the working chambers and the low pressure oil line, and wherein the hydraulic transmission is at least partially constituted of a plurality of modules.

The "module" herein refers to a unit, which constitutes a part of the hydraulic transmission and is standardized component unit. Each of the modules shares the same shape and structure. And each of the modules preferably performs common functions under the same operation, has the same performance and is designed with the same performance. Further, each module is similar to one another but may include a few differences in a design.

In the above wind turbine generator or the tidal current generator, the hydraulic transmission includes a combination of the hydraulic pump and the hydraulic motor and thus, it is possible to reduce the weight and cost of the wind turbine generator in comparison with a conventional wind turbine generator or a conventional tidal current generator using a mechanical gearbox.

Further, to adopt the hydraulic transmission comprising various parts such as the cylinder, the piston, the cam, the high pressure valve and the low pressure valve, the hydraulic transmission is at least partially formed by a plurality of modules, and thus the productivity and the maintainability is improved. Specifically, by forming the hydraulic transmission by the module, the hydraulic transmission can be easily assembled and the productivity of the wind turbine generator or the tidal current generator is improved. Further, even when the hydraulic transmission breaks down, the modules can be individually replaced, that is only the module causing the failure needs to be replaced. As a result, the maintenance can be easily performed on the wind turbine generator or the tidal current generator.

Furthermore, by changing the number of the modules of the hydraulic transmission depending on the desired output, a variety of wind turbine generators or tidal current generators with different output can be efficiently produced.

In the above wind turbine generator or the tidal current generator, it is preferable that the hydraulic pump is constituted of the plurality of the modules, each of the modules being composed of a cylinder block having at least one cylinder, the piston, the high pressure valve and the low pressure valve that are provided for each of the at least one cylinder of the cylinder block.

As described above, the hydraulic pump is constituted of the plurality of the modules, each of which is composed of the cylinder block and the component group attached thereto such as the piston, the high pressure valve and the low pressure valve. As a result, the productivity and maintainability of the wind turbine generator or the tidal current generator can be significantly improved.

In such a case, it is preferable that the piston of the hydraulic pump includes a piston body which moves slidingly in the cylinder, and a piston roller or a piston shoe that is mounted on the piston body and is in engagement with the cam surface of the cam.

As described above, the piston of the hydraulic pump is formed by the piston body and the piston including the piston roller or the piston shoe so that the piston can smoothly operate along the cam surface. The number of parts increases by using the piston including the piston body and the piston roller or the piston shoe. However, the piston can be mounted in the above described module (cylinder block and the component group attached thereto) while still maintaining the productivity and the maintainability of the wind turbine generator.

Further, it is preferable that the cylinder block of the hydraulic pump extends in an axial direction of a rotation shaft of the pump, comprises at least one cylinder array and is formed into an arc shape partially covering an outer circumference of the rotation shaft of the pump, each of the at least one cylinder array being composed of the cylinders arranged in the axial direction of the rotation shaft of the pump, and also that in the hydraulic pump is constituted of a plurality of modules arranged around the rotation shaft of the pump, each of the modules being composed of the cylinder block of the arc shape, the piston, the high pressure valve and the low pressure valve that are provided for each of the cylinders of the cylinder block.

The piston, the high pressure valve and the low pressure valve are built in the cylinder block and thus, the outer shape of the module is defined by the cylinder block, instead of the component group (the piston, the high pressure valve and the low pressure valve). As the outer shape of the module is set by the shape of the cylinder block, the shape of the cylinder block has a significant effect on the workability of assembling and disassembling the hydraulic pump. Particularly in such a case that the rotation shaft of the wind turbine is longer than 1 m, the size of the hydraulic pump is comparatively large and it is hard to perform the assembling/disassembling of the hydraulic pump. By making the outer shape of the module easy for workers to handle, the assembling/disassembling of the hydraulic pump can be efficiently performed.

In this regard, by using the arc-shaped cylinder block extending in the direction of the rotation axis of the pump, the module can be easily removed or installed when assembling/disassembling the hydraulic pump, thereby improving the maintainability of the wind turbine generator or the tidal current generator.

In this case, it is preferable that the cylinder block of the hydraulic pump includes a plurality of the cylinder arrays arranged around the rotation shaft of the pump, and the high pressure communication path through which the working chambers of the cylinders belonging to adjacent cylinder arrays of the cylinder arrays are communicated with the high pressure oil line is arranged between the adjacent cylinder arrays.

In this manner, the plurality of the cylinder arrays are arranged around the rotation shaft of the pump, and the high pressure communication path through which the working chambers of the cylinders belonging to adjacent cylinder arrays are communicated with the high pressure oil line is arranged between the adjacent cylinder arrays. Therefore, the high pressure communication path can be shared among the cylinders belonging to the adjacent cylinder arrays. Further, the high pressure communication through which high pressure operating oil flows is arranged in the cylinder block, thereby improving liquid-tight thereof.

The hydraulic pump is partially constituted of the cylinder block with the end plate which comes in contact with the cylinder block. Typically, a pair of the end plates are arranged on or around the outer circumference of the rotation shaft of the pump in the axial direction of the rotation shaft of the pump to interpose a plurality of the cylinder blocks.

Alternatively, the cylinder block of the hydraulic pump may be formed into an annular shape around the entire circumference of the rotation shaft of the pump in a continuous manner, and the hydraulic pump may be constituted of a plurality of modules that are arranged in the axial direction of the rotation shaft of the pump, each of the modules being composed of the cylinder block of the annular shape, the piston, the high pressure valve and the low pressure valve that are provided for each of the cylinders of the cylinder block.

As described above, each of the modules is composed of the cylinder block and the component group attached therein. By changing the number of the modules disposed in the axial direction of the rotation shaft of the pump, or around the shaft, various types of wind turbine generators or tidal current generators with different outputs can be produced efficiently with fewer variety of parts. In this case, substantially same end plates can be used among a variety of generators with different outputs and it is possible to change the axial direction of the rotation shaft of the pump and the number of modules arranged between the end plates.

In the wind turbine generator, it is preferable that the ring cam of the hydraulic pump has the cam surface defining a plurality of waves with concave portions and convex portions that are alternately disposed around the rotation shaft of the pump, and that the ring cam is annularly formed by arranging a plurality of modules side by side in a circumferential direction of the rotation shaft of the pump, each of the modules being one of arc-shaped members into which the ring cam is divided in the circumferential direction of the rotation shaft of the pump.

As described above, the cam of the hydraulic pump is the ring cam with the cam surface defining a plurality of waves with concave portions and convex portions that are alternately disposed around the rotation shaft of the pump. While the shaft makes one rotation, the piston of the hydraulic pump can move numerous times, thereby achieving large torque of the hydraulic pump. Further, the ring cam of the hydraulic pump is formed by arranging a plurality of arc-shaped modules side by side in the circumferential direction of the rotation shaft of the pump, thereby significantly improving the productivity and maintainability of the hydraulic pump.

Alternatively, the wind turbine generator may be constructed such that the cam of the hydraulic pump is a ring cam which has a cam surface defining a plurality of waves with a plurality of concave portions and convex portions that are alternately disposed around the rotation shaft of the pump, the ring cam being formed annularly around the entire circumference of the rotation shaft of the pump in a continuous manner, and the ring cam forms the module, and a plurality of the modules are arranged in the axial direction of the rotation shaft of the pump to form the hydraulic pump.

As described above, the cam of the hydraulic pump is the ring cam with the cam surface defining a plurality of waves with concave portions and convex portions that are alternately disposed around the rotation shaft of the pump. While the shaft makes one rotation, the piston of the hydraulic pump can move numerous times, thereby achieving large torque of the hydraulic pump. Further, the ring cam being formed annularly around the entire circumference of the rotation shaft of the pump in a continuous manner, and the ring cam forms the module. By simply changing the number of the modules disposed in the axial direction of the shaft, various types of wind turbine generators with different outputs can be efficiently produced.

In the above wind turbine generator, it is also preferable that the cam of the hydraulic pump is a ring cam which is disposed circumferentially around the rotation shaft of the pump and has a cam surface defining a plurality of waves with a plurality of concave portions and convex portions that are alternately disposed around the rotation shaft of the pump, and that a plurality of the ring cams are arranged in the axial direction of the rotation shaft of the pump such that phases of the cam surfaces of the ring cams are displaced with respect to each other.

By this, the timing of the movement of the pistons can be delayed from one another by each of the ring cams, thereby reducing the vibration of the hydraulic pump.

It is also preferable in the above wind turbine generator that the hydraulic transmission includes a plurality of the hydraulic motors each of which forms the module.

In such a case, a plurality of sets of the hydraulic motor and the generator forming the module may be provided in the wind turbine generator.

In the conventional wind turbine generator equipped with a mechanical gearbox, the shaft, the generator and the output shaft are mechanically connected. Thus, the conventional wind turbine generator has an extremely complex structure to transmit the torque of the shaft to a plurality of output shafts. On the other hand, in the wind turbine generator equipped with the hydraulic transmission, by simply arranging a plurality of hydraulic motors and connecting the high pressure oil line and the low pressure oil line to each of the hydraulic motors, the torque of the shaft can be transmitted to the output shaft of the plurality of hydraulic motors. In this manner, by transmitting the torque of the shaft to the output shaft of the hydraulic motors, the hydraulic motors and the generator connected thereto can be downsized and the flexibility of arranging the hydraulic motors and the generator is improved.

Moreover, by making each of the hydraulic motors one module and changing the number of the modules (the number of the hydraulic motors), various types of wind turbine generators with different outputs can be produced efficiently.

In the above wind turbine generator, it is preferable that the cam of the hydraulic motor is an eccentric cam that is disposed eccentrically with respect to a shaft center of a crank shaft connected to the generator, and the hydraulic motor is constituted of a plurality of the modules arranged in an axial direction of the crank shaft, each of the modules being composed of the cylinder block having at least one cylinder, the piston, the high pressure valve and the low pressure valve that are provided for each of the at least one cylinder of the cylinder block, the cylinder block being disposed circumferentially around a center axis of the crankshaft in a continuous manner.

By making one module of the cylinder block and the component group attached thereto and changing the number of the modules disposed in the axial direction of the crank shaft, various types of wind turbine generators with different outputs can be efficiently produced.

In the above wind turbine generator, it is also preferable that the piston of the hydraulic motor includes a piston body which moves slidingly in the cylinder, and a piston roller or a piston shoe that is mounted on the piston body and is in engagement with the cam surface of the cam.

As described above, by using the piston including the piston body and the piston roller or the piston shoe as the piston of the hydraulic motor, the cam can rotate smoothly in synchronization with the vertical movement of the piston. Further, The number of parts increases by using the piston including the piston body and the piston roller or the piston shoe. However, the piston can be installed in the above described module (cylinder block and the component group attached thereto) while still maintaining the productivity and the maintainability of the wind turbine generator.

Alternatively, the cam of the hydraulic motor may include an eccentric cam that is disposed eccentrically with respect to a shaft center of a crank shaft connected to the generator, and the hydraulic motor may be constituted of a plurality of the modules arranged in a circumferential direction of the crank shaft, each of the modules being composed of a cylinder block having at least one cylinder and partially covering the cam surface of the eccentric cam, the piston, the high pressure valve and the low pressure valve that are provided for each of the at least one cylinder of the cylinder block.

In the above wind turbine generator, it is also preferable that the cam of the hydraulic motor includes a plurality of eccentric cams that are disposed eccentrically with respect to a shaft center of a crank shaft connected to the generator, and the plurality of the eccentric cams are arranged in an axial direction of the crank shaft such that phases of the cam surfaces of the eccentric cams are displaced with respect to each other.

A low pressure oil line may comprise a portion that is open to the atmosphere, but the fluid therein is preferably, in use, at a pressure above atmospheric pressure. The low pressure oil line may comprise hoses or pipes, and preferably comprises conduits formed into the bodies of the hydraulic pump and hydraulic motor.

By this, the pitches of reciprocation motions of the pistons to rotate each of the eccentric cams, can be displaced from one another, thereby reducing the vibration of the hydraulic pump.

Advantageous Effects of Invention

According to the present invention, the wind turbine generator or the tidal current generator uses the hydraulic transmission including the combination of the hydraulic pump and the hydraulic motor and thus, it is possible to reduce the weight and cost of the wind turbine generator in comparison with a conventional wind turbine generator or the tidal current generator using a mechanical gearbox.

Further, to adopt the hydraulic transmission comprising various parts such as the cylinder, the piston, the cam, the high pressure valve and the low pressure valve, the hydraulic transmission is at least partially formed by a plurality of modules, and thus the productivity and the maintainability is improved. Specifically, by forming the hydraulic transmission by the module, the hydraulic transmission can be easily assembled and the productivity of the wind turbine generator and the tidal current generator is improved. Further, even when the hydraulic transmission breaks down, the modules can be individually replaced, that is only the module causing the failure needs to be replaced. As a result, the maintenance can be easily performed on the wind turbine generator and the tidal current generator.

Furthermore, by changing the number of the modules of the hydraulic transmission depending on the desired output, a variety of turbine generators with different output can be efficiently produced.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
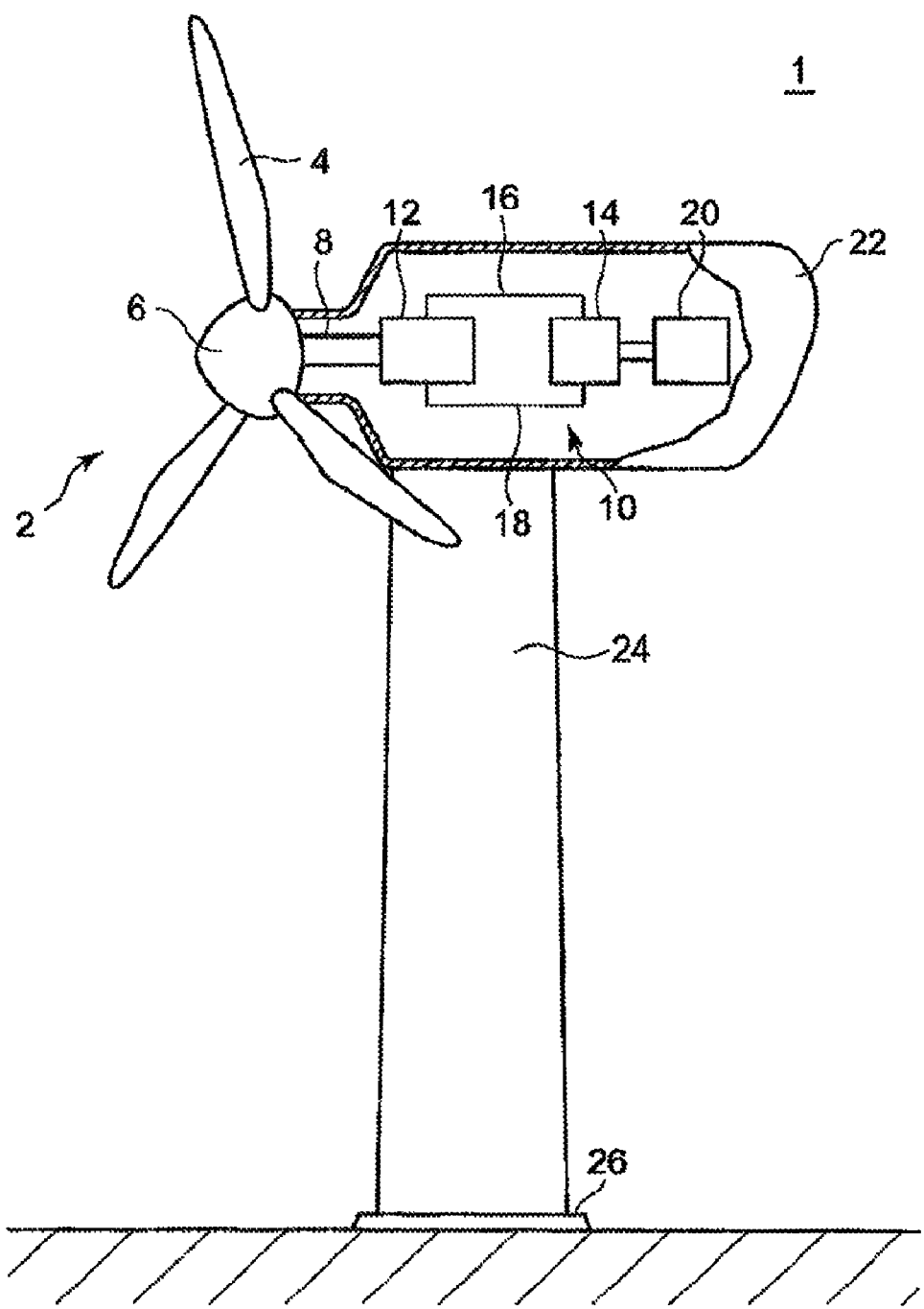
FIG. 1 is a schematic view showing an example structure of a wind turbine generator.
Figure 2:
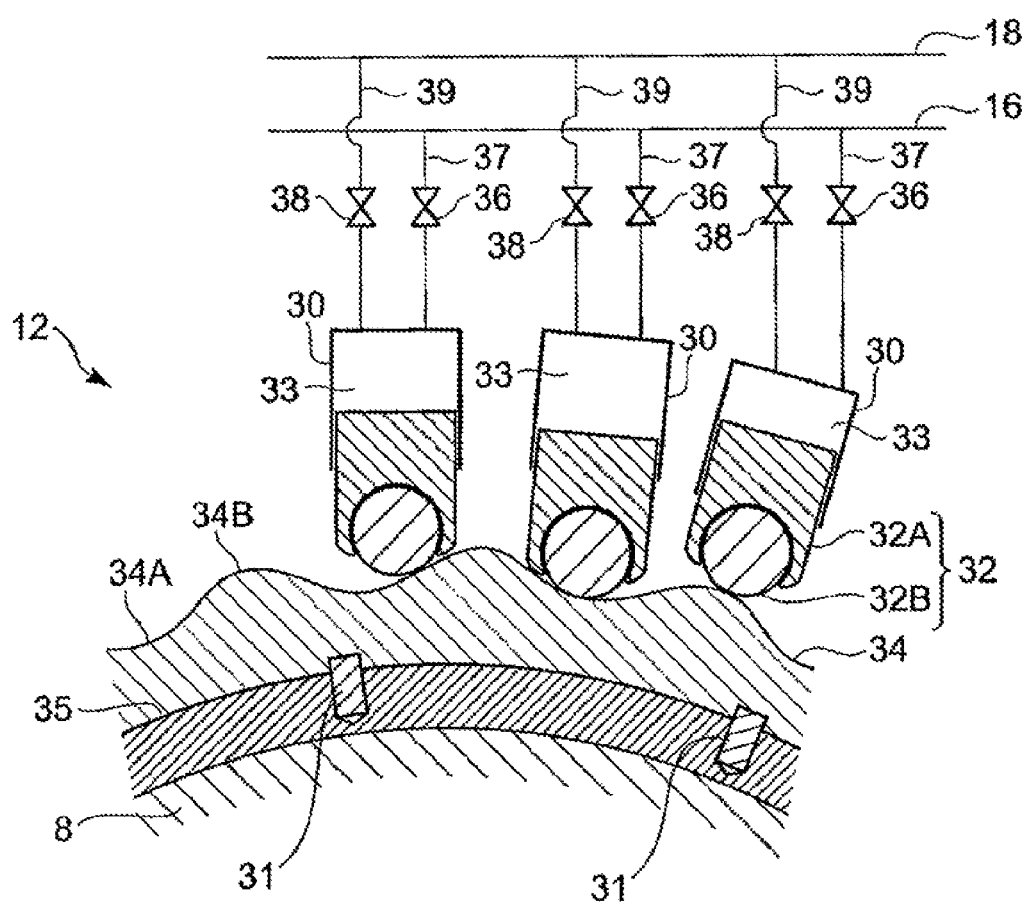
FIG. 2 is a view showing an example configuration of a hydraulic pump of the wind turbine generator.
Figure 3:
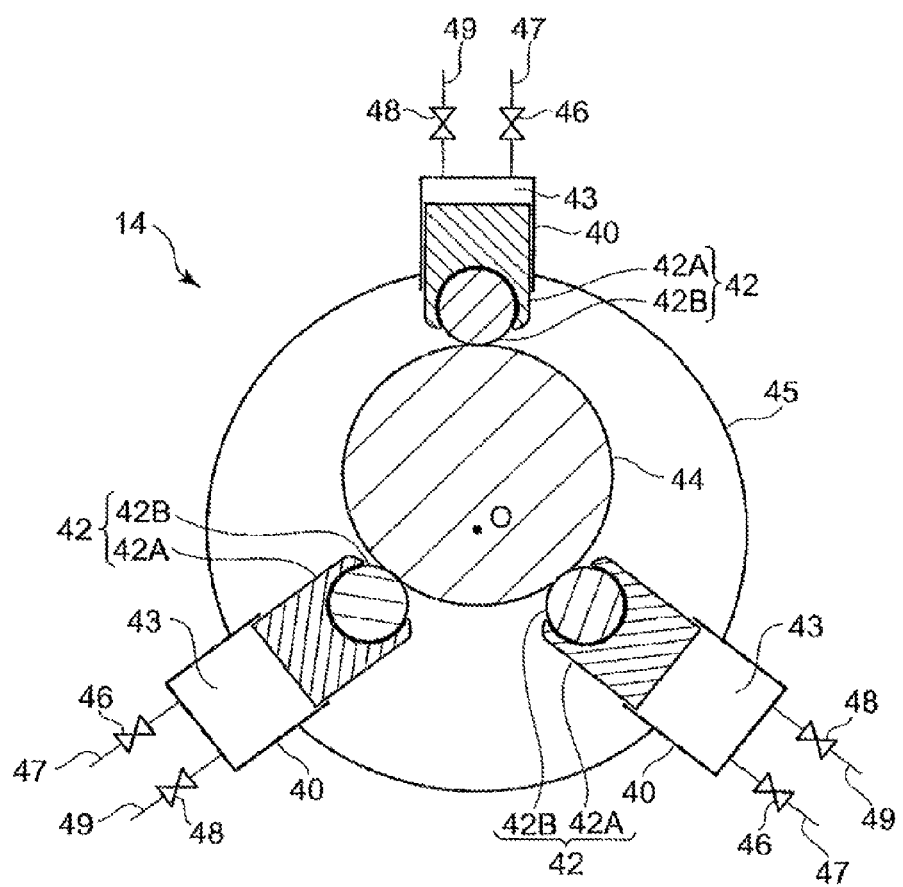
FIG. 3 is a view showing an example configuration of a hydraulic motor of the wind turbine generator.

A general structure of the wind turbine generator in relation to the present invention is explained hereinafter. FIG. 1 is a schematic view showing an example structure of the wind turbine generator. FIG. 2 is a schematic view showing an example structure of the wind turbine generator. FIG. 2 is a view showing an example configuration of a hydraulic pump of the wind turbine generator. FIG. 3 is a view showing an example configuration of a hydraulic motor of the wind turbine generator.

As an example of the wind turbine generator, a three-bladed wind turbine is used. However, the present invention is not limited to this example and can be applied to various types of wind turbines.

As illustrated in FIG. 1, a wind turbine generator 1 comprises a rotor 2 rotated by the wind, a hydraulic transmission 10 for increasing rotation speed of the rotor 2, a generator 20 for generating electric power, a nacelle 22 and a tower 24 for supporting the nacelle 24.

The rotor 2 is constructed such that a main shaft 8 (rotation shaft of the pump) is connected to a hub 6 having blades 4. Specifically, three blades 4 extend radially from the hub 6 and each of the blades 4 is mounted on the hub 6 connected to the main shaft 8. By this, the power of the wind acting on the blades 4 rotates the entire rotor 2, the rotation of the rotor 2 is inputted to the hydraulic transmission 10 via the main shaft 8. The hub 6 may house a pitch driving mechanism for changing a pitch angle of the blades 4.

The hydraulic transmission 10 includes a hydraulic pump 12 of a variable displacement type which is rotated by the main shaft 8, a hydraulic motor 14 of a variable displacement type which is connected to the generator 20, and a high pressure oil line 16 and a low pressure oil line 18 which are arranged between the hydraulic pump 12 and the hydraulic motor 14. The high pressure oil line 16 connects a discharge side of the hydraulic pump 12 and an intake side of the hydraulic motor 14. The low pressure oil line 18 connects a discharge side of the hydraulic motor 14 and an intake side of the hydraulic pump 12. By this, the rotation of the main shaft 8 rotates the hydraulic pump 12, thereby creating a pressure difference between the high pressure oil line 16 and the low pressure oil line 18. The pressure difference drives the hydraulic motor 14. The hydraulic transmission 10 adjust a speed increasing ratio (displacement ratio of the hydraulic pump 12 and the hydraulic motor 14) in accordance with the rotation speed of the main shaft 8 so as to maintain the rotation speed of the hydraulic motor 14 at a constant speed.

As shown in FIG. 2, the hydraulic pump 12 has a plurality working chambers 33 surrounded by the cylinders 30 and the pistons 32, a cam 34 having a cam surface which engages with the pistons 32, and sets of a high pressure valve 36 and a low pressure valve 38, each set of which is provided for each of the working chambers 33.

The cylinder 30 is a cylindrical space formed in a cylinder block that is described later. Inside the cylinder 30, is formed the working chamber 33 surrounded by the cylinder 30 and the piston 32.

From the perspective of operating the pistons 32 smoothly along the cam surface of the cam 34, each of the pistons 32 preferably comprises a piston body 32A which moves slidingly in the cylinder 30 and a piston roller or a piston shoe which is mounted on the piston body 32A and engages with the cam surface of the cam 34. The "piston roller" is a member that comes in contact with the cam surface of the cam 34 and rolls thereon. The "piston shoe" is a member that comes in contact with the cam surface of the cam 34 and slides thereon.

The example illustrated in FIG. 2 shows the pistons 32 each of which has the piston body 32A and the piston roller 32B.

The cam 34 is installed on an outer circumference of the main shaft 8 via a cam mount 35. For one rotation of the main shaft 8, the cam 34 moves each of the pistons 32 of the hydraulic pump upward and downward many times, thereby increasing the torque of the hydraulic pump. From this point of view, the cam 34 is preferably a ring cam that has a cam surface defining a plurality of waves with concave portions 34A and convex portions 34B that are alternately disposed around the main shaft.

The cam 34 is fixed to the cam mount 35 by means of a securing member such as a bolt, a key and a pin.

The high pressure valve 36 is arranged in a high pressure communication path 37 between the high pressure oil line 16 and each of the working chambers 33. Meanwhile, the low pressure valve 38 is arranged in a low pressure communication path 39 between the low pressure oil line 18 and each of the working chambers 33. By opening and closing the high pressure valve 36 and the low pressure valve 38, it is possible to change a communication status between the high pressure oil line 16 and each of the working chambers 33 and between the low pressure oil line 18 and the low pressure oil line 18. The opening and closing of the high pressure valve 36 and the low pressure valve 38 is performed in synchronization with the upward and downward motion of the piston 32.

In the hydraulic pump 12, when the cam 34 rotates with the main shaft 8, the piston body 32A of each piston 32 moves upward and downward periodically. And in the hydraulic pump 12, a pump step in which the piston 32 moves from the bottom dead center to the top dead center and an intake step in which the piston 32 moves from the top dead center to the bottom dead center are performed repeatedly. In the pump step, the high pressure valve 36 is opened and the low pressure valve 38 is closed so as to feed the high pressure oil in the working chamber 33 to the high pressure oil line 16 via the high pressure communication path 37. Meanwhile, in the intake step, the high pressure valve 36 is closed and the low pressure valve 38 is opened so as to supply the low pressure oil from the low pressure oil line 18 to the working chamber 33 via the low pressure communication path 39.

In this manner, the hydraulic pump 12 is rotated by the rotation of the main shaft 8, thereby generating the pressure difference between the high pressure oil line 16 and the low pressure oil line 18.

As illustrated in FIG. 3, the hydraulic motor 13 comprises a plurality of hydraulic chambers 43 formed between the cylinders 40 and the pistons 42, the cam 44 having a cam surface which engages with the pistons 42, and the high pressure valve 46 and the low pressure valve 48 that are provided for each of the hydraulic chambers 43.

The cylinder 40 is a cylindrical space provided for a cylinder block that is described later. Inside the cylinder 40, formed is the working chamber 43 surrounded by the cylinder 40 and the piston 42.

From the perspective of converting the upward and downward motion of the pistons 42 smoothly to the rotary motion of the cam 44, each of the pistons 42 preferably comprises a piston body 42A which moves slidingly in the cylinder 40 and a piston roller or a piston shoe which is mounted on the piston body 42A and engages with the cam surface of the cam 44. Herein, the "piston roller" is a member that comes in contact with the cam surface of the cam 34 and rotates thereon. The "piston shoe" is a member that comes in contact with the cam surface of the cam 34 and slides thereon.

FIG. 3 shows an example in which each of the pistons 42 has the piston body 42A and the piston roller 42B.

The cam 44 is an eccentric cam that is disposed eccentrically with respect to a shaft center O of a crank shaft 45 connected to the generator 20. While the pistons 42 complete one set of upward and downward motions, the cam 44 and the crankshaft 45 on which the cam 44 is mounted, complete one rotation.

The high pressure valve 46 is arranged in a high pressure communication path 47 between the high pressure oil line 16 and each of the working chambers 43. Meanwhile, the low pressure valve 48 is arranged in a low pressure communication path 49 between the low pressure oil line 18 and each of the working chambers 43. By opening and closing the high pressure valve 46 and the low pressure valve 48, it is possible to change a communication status between the high pressure oil line 16 and each of the working chambers 43 and between the low pressure oil line 18 and the low pressure oil line 18. The opening and closing of the high pressure valve 46 and the low pressure valve 48 is performed in synchronization with the upward and downward motion of the piston 42.

In the hydraulic motor 14, the pistons 42 are moved up and down by utilizing the pressure difference between the high pressure oil line 16 and the low pressure oil line 18. And in the hydraulic motor 14, a motor step in which the pistons 42 move from the top dead center to the bottom dead center and a discharge step in which the pistons 42 move from the bottom dead center to the top dead center are performed repeatedly. In the motor step, the high pressure valve 46 is opened and the low pressure valve 48 is closed so as to supply the high pressure oil from the high pressure oil line 16 to the working chamber 43 via the high pressure communication path 47. Meanwhile, in the discharge step, the high pressure valve 46 is closed and the low pressure valve 48 is opened so as to discharge operating oil in the working chamber 43 to the low pressure oil line 18 via the low pressure communication path.

In this manner, the high pressure oil fed into the working chamber 43 in the motor step pushes down the piston 42 to the bottom dead center, and then the crank shaft 45 rotates with the cam 44.

As illustrated in FIG. 1, the generator 20 is connected to the hydraulic motor 14 of the hydraulic transmission 10. The known synchronous generator or induction generator can be used as the generator 20. The torque having the rotation speed that is almost constant is inputted from the hydraulic motor 14 to the generator 20 and then the generator 20 generates AC power having a frequency that is almost constant.

The nacelle 22 supports the hub of the rotor 2 rotatably and houses a variety of devices such as the hydraulic transmission 10 and the generator 20. The nacelle 22 is further supported on the tower 24 rotatably and may be turned in accordance with the wind direction by a yaw motor which is not shown.

The tower 24 is formed into a column extending upward from a base 26. For instance, the tower 24 can be constituted of one column member or a plurality of units that are connected in a vertical direction to form a column shape. If the tower 24 is constituted of the plurality of units, the nacelle 22 is mounted on the top-most unit.

Next, a detailed configuration of the hydraulic transmission 10 for the wind turbine generator 1 in relation to the preferred embodiment is explained. In the wind turbine generator 1, the hydraulic transmission 10 is constituted at least partially of a plurality of modules. Hereinafter, the configuration of the hydraulic transmission 10 is explained by using the following examples, the example wherein the hydraulic pump 12 of the hydraulic transmission 10 is formed by a plurality of modules, the example wherein the hydraulic transmission is formed by using a plurality of the hydraulic motors 14 as a module, and the example wherein the hydraulic motor 14 of the hydraulic transmission 10 is formed by a plurality of modules.

(Hydraulic Pump Module)

Figure 4:
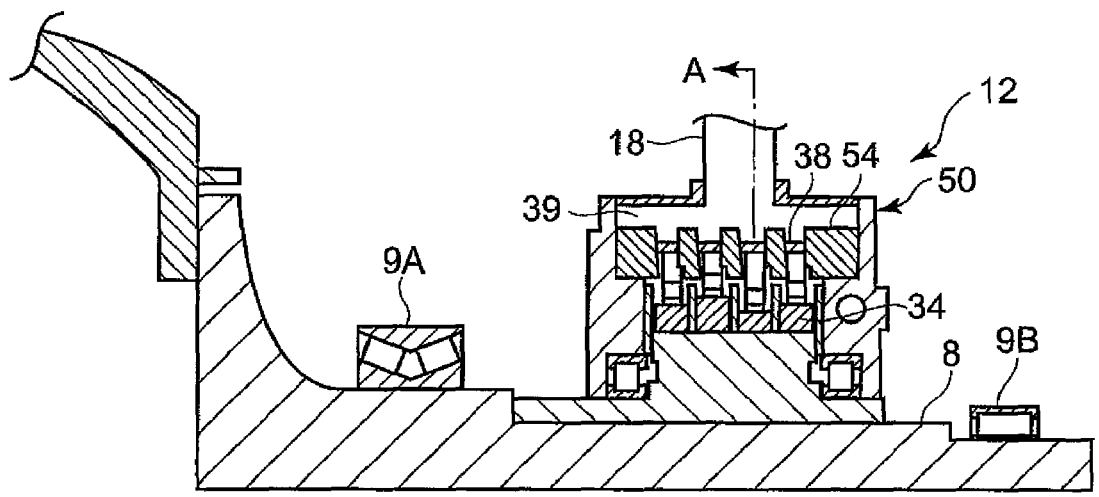
FIG. 4 is an illustration of an example of the hydraulic pump constituted of a plurality of modules.
Figure 4:
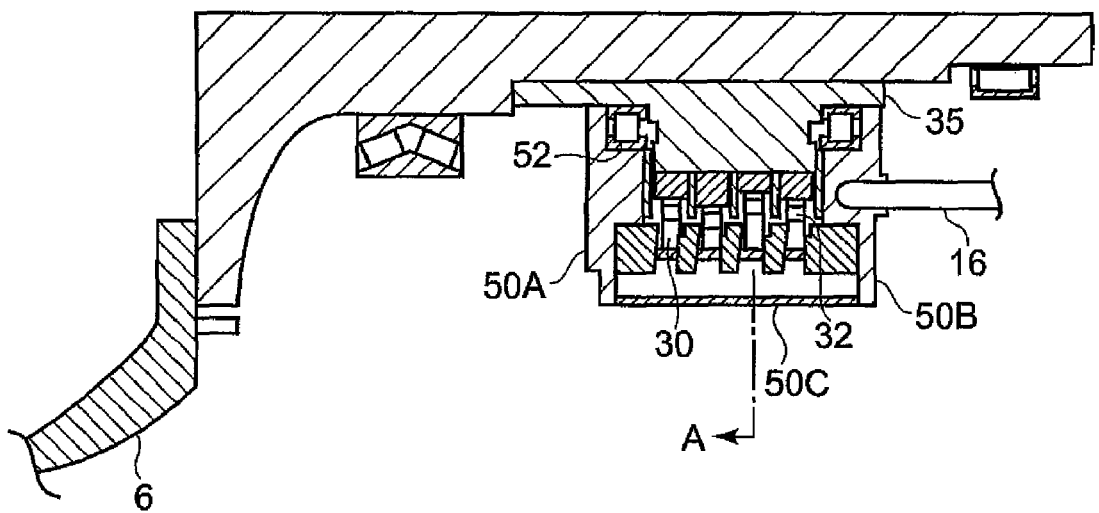
Figure 5:
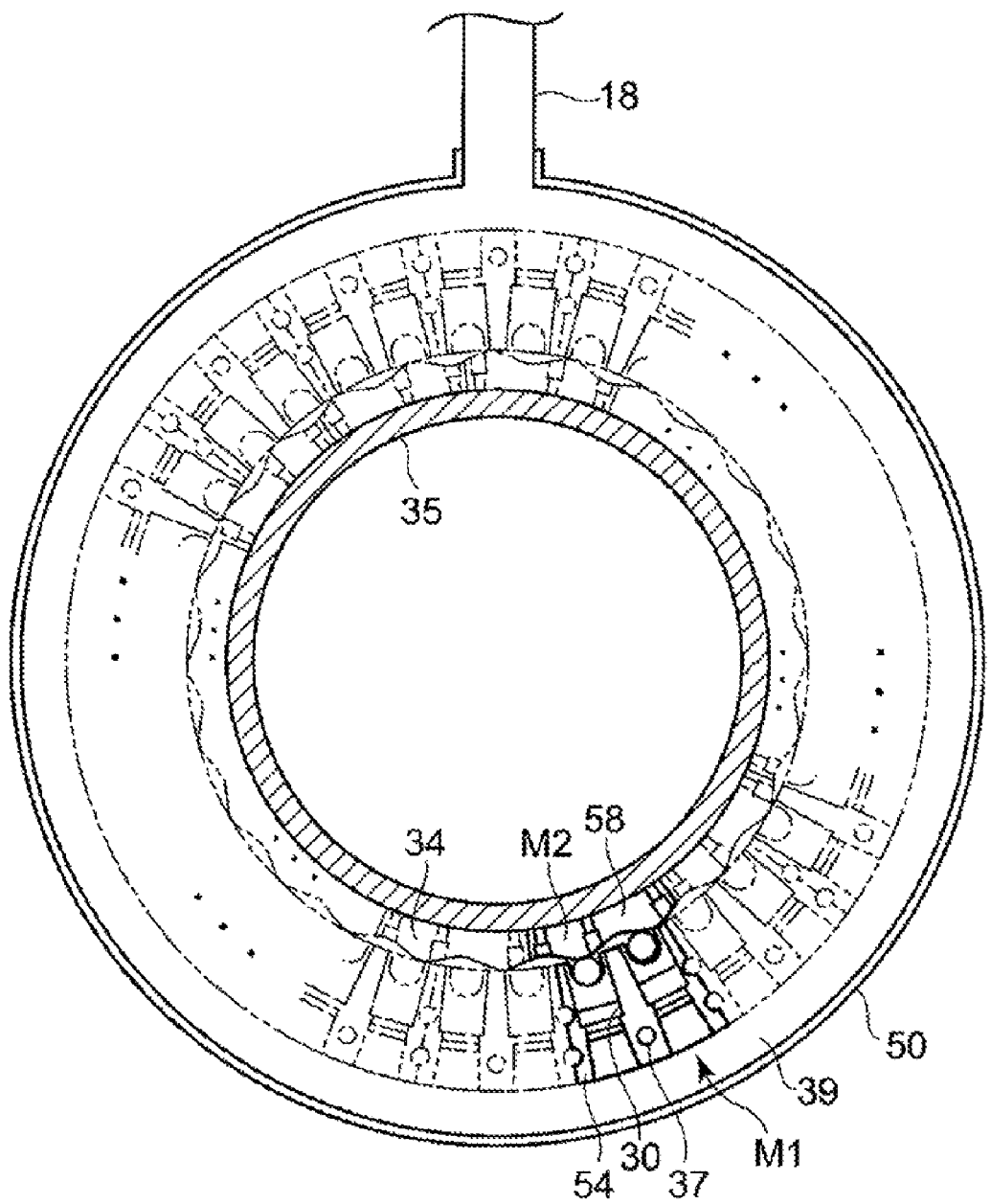
FIG. 5 is a sectional view taken along a line A-A of FIG. 4.
Figure 6:
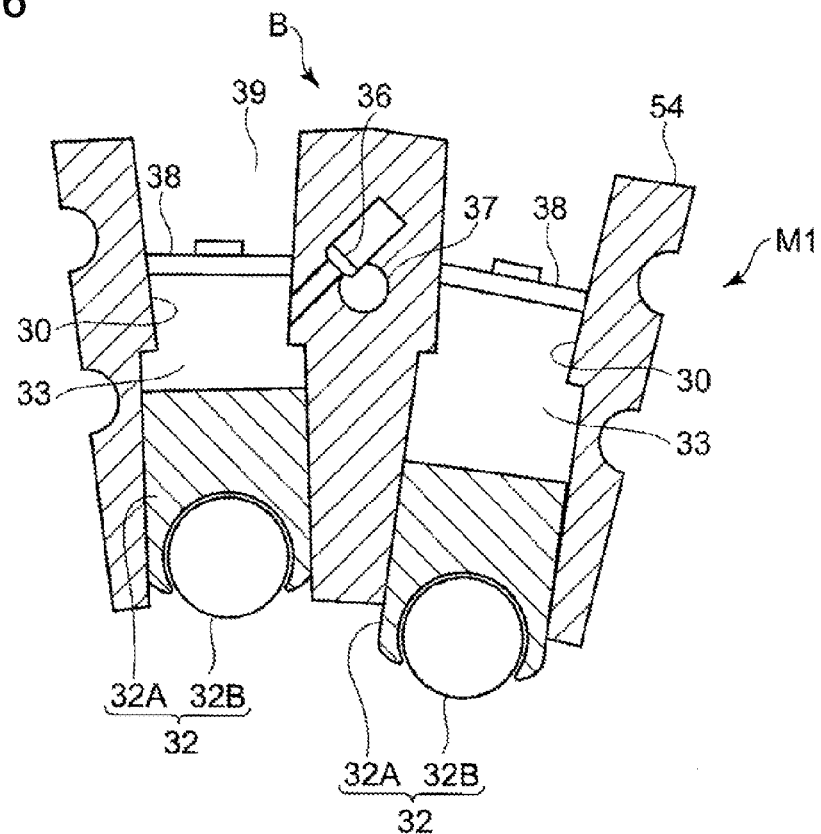
FIG. 6 is a sectional view showing a cylinder block constituting the module of the hydraulic pump.
Figure 7:
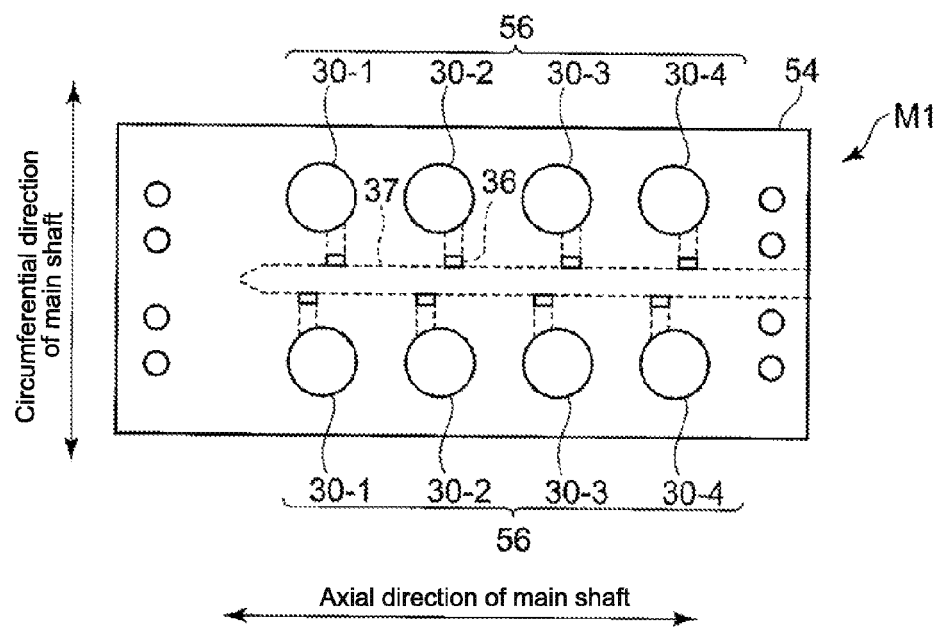
FIG. 7 is a plain view of the cylinder block from a direction B of FIG. 6.

FIG. 4 illustrates an example of the hydraulic pump constituted of a plurality of modules. FIG. 5 is a sectional view taken along a line A-A of FIG. 4. FIG. 6 is a sectional view showing a cylinder block constituting the module of the hydraulic pump 12. FIG. 7 is a plain view of the cylinder block from a direction B of FIG. 6.

FIG. 4 shows the hydraulic pump 12 mounted on the main shaft 8. Specifically, the cam mount 3 is fixed to the outer circumference of the main shaft 8 and the cam 34 is mounted on the cam mount 35. Further, in the example illustrated in FIG. 4, the hydraulic pump 12 is arranged between main shaft bearings 9A and 9B for supporting the main shaft 8 rotatably on the nacelle side.

On the outer circumference of the cam mount 35, a pump casing 50 is fixed via a pump bearing 52. The pump casing 50 covers each part of the cylinders 30, the pistons 32, the high pressure valve 36, the low pressure valve 38 and the cams 34, and also prevents the operating oil from leaking to outside. Further, the pump casing 50 comprises a pair of end plates 50A and 50B arranged in the axial direction of the main shaft 8 and a cylindrical case 50C arranged between the pair of end plates 50A and 50B.

The hydraulic pump 12 is constituted of the plurality of the modules, each of the modules being composed of a cylinder block 54 having at least one cylinder 30, the piston 32, the high pressure valve 36 and the low pressure valve 38 that are provided for each of the cylinders 30 of the cylinder block 54. The module is formed by the cylinder block 54 and attached components such as the piston 32, the high pressure valve 36 and the low pressure valve 38. In this manner, the hydraulic pump 12 is constituted by combining the plurality of the modules so as to significantly improve the productivity and the maintainability of the wind power generator 1.

As shown in FIG. 7, each of the cylinder blocks 54 is an arc-shaped member in cross-section that extends in an axial direction of the main shaft 8. Each of the cylinder blocks 54 comprises at least one cylinder array 56 (See FIG. 7). As FIG. 7 shows, each of the cylinder blocks 54 is composed of the cylinders 31-1, 30-2, 30-3 and 30-4, arranged in the axial direction of the main shaft 8. For the cylinder blocks 54, a pair of the piston 32, the high pressure valve 36 and the low pressure valve 38 are arranged for each of the cylinders 30.

As illustrated in FIG. 5, the hydraulic pump 12 is constituted of a plurality of modules M1 arranged in a circumferential direction of the main shaft 8, each of the modules M1 being composed of the cylinder block 54 of the arc shape, the piston 32, the high pressure valve 36 and the low pressure valve 38 that are provided for each of the cylinders 30 of the cylinder block 54.

The piston 32, the high pressure valve 36 and the low pressure valve 38 are integrated in the cylinder block 54 and this component group constituted of the piston 32, the high pressure valve 36 and the low pressure valve 38 does not define a shape of the module. The shape of the module is defined by the cylinder block 54 and significantly affects workability of disassembling and assembling of the hydraulic pump 12. On this point, the cylinder block 54 of the arc shape extending in the axial direction of the main shaft 8 is used so that the modules M1 can be easily mounted or dismounted when assembling or disassembling the hydraulic pump 12. As a result, the maintainability of the wind turbine generator 1 is improved.

The cylinder block 54 includes a plurality of the cylinder arrays 56 arranged in the circumferential direction of the main shaft 8. And the high pressure communication path 37 through which the fluid chambers 33 of the cylinders 30 belonging to the cylinder arrays 56 that are adjacent to each other are communicated with the high pressure fluid line, is arranged between the adjacent cylinder arrays 56. In the example illustrated in FIG. 7, the high pressure communication path 37 is arranged between a pair of adjacent cylinder arrays 56. Eight cylinders 30 belong to the pair of adjacent cylinder arrays 56. Each working chamber 33 of each of eight cylinders 30 is connected to the high pressure communication path 37 via the high pressure valves 36. In this manner, a standarized high pressure communication path 37 can be used for all of the cylinders 30 belonging to the adjacent cylinder arrays 56. Further, the high pressure communication path 37 through which the operating oil of high pressure moves is arranged on a side of the cylinder block 54, and thus the liquid tightness is improved, i.e. the leaking of the operating oil is suppressed.

Further, in the same manner as the high pressure communication path 37, a standardized low pressure communication path 39 can be used for the plurality of cylinders 30. In this case, the high pressure communication path 37 and the low pressure communication path 39 that are standardized for the plurality of cylinders 30, may be placed to extend from opposite ends of the cylinder block 54 along the axial direction of the main shaft 8.

Furthermore, the high pressure oil from the working chambers 33 is fed through the high pressure communication path 37 to the high pressure oil line 16 which is connected to a back end side of the hydraulic pump 12, e.g. the side farthest from the hub 6 of the hydraulic pump 12.

Meanwhile, as shown FIG. 4 and FIG. 5 illustrate, the low pressure communication path 39 is arranged an outer side of the cylinder blocks 54 in the radial direction of the main shaft 8 and on an inner side of the pump casing 50 in the radial direction. The low pressure communication path 39 is a common low pressure communication path provided for the plurality of the cylinders 30 and communicates with the low pressure oil line 18 connected to a top of the hydraulic pump 12. In this manner, the low pressure oil of the low pressure oil line 18 flows through the low pressure communication path 39 and then is supplied to each of the working chambers 33 via the low pressure valves 38.

As illustrated in FIG. 5, the cam 34 of the hydraulic pump 12 may be annularly formed by a number of modules M2 arranged side by side in a circumferential direction of the main shaft 8. Each of the modules M2 is an arc-shaped member 58 into which the above-mentioned ring cam (see FIG. 2) is divided in the circumferential direction of the main shaft 8. In this manner, the arc-shaped members 58 are arranged side by side in the circumferential direction of the main shaft 8 as modules M2 so as to form the ring cam, i.e. the cam 34. As a result, the productivity and the ease of the maintenance of the hydraulic pump 12 can be significantly improved.

As shown in FIG. 4, arrays of the cams 34 of the hydraulic pump 12 are arranged in the axial direction of the main shaft 8. In this, it is preferable to arrange such that the cam surfaces of each of the cams 34 are displaced with respect to each other to reduce the vibration of the hydraulic pump 12 by delaying the timing of the movement of the pistons 32 from one another. In other words, at one location in the circumferential direction of the main shaft 8, the plurality of cams 34 arranged in the axial direction of the main shaft 8 have different height from one another.

As explained above, the configuration of the hydraulic pump 12 by adopting the modules M1 and M2 is explained in reference to FIG. 4 to FIG. 7. However, embodiments of the modularization of the hydraulic pump 12 is not limited to the above examples and the following modules may constitute the hydraulic pump 12.

Figure 8:
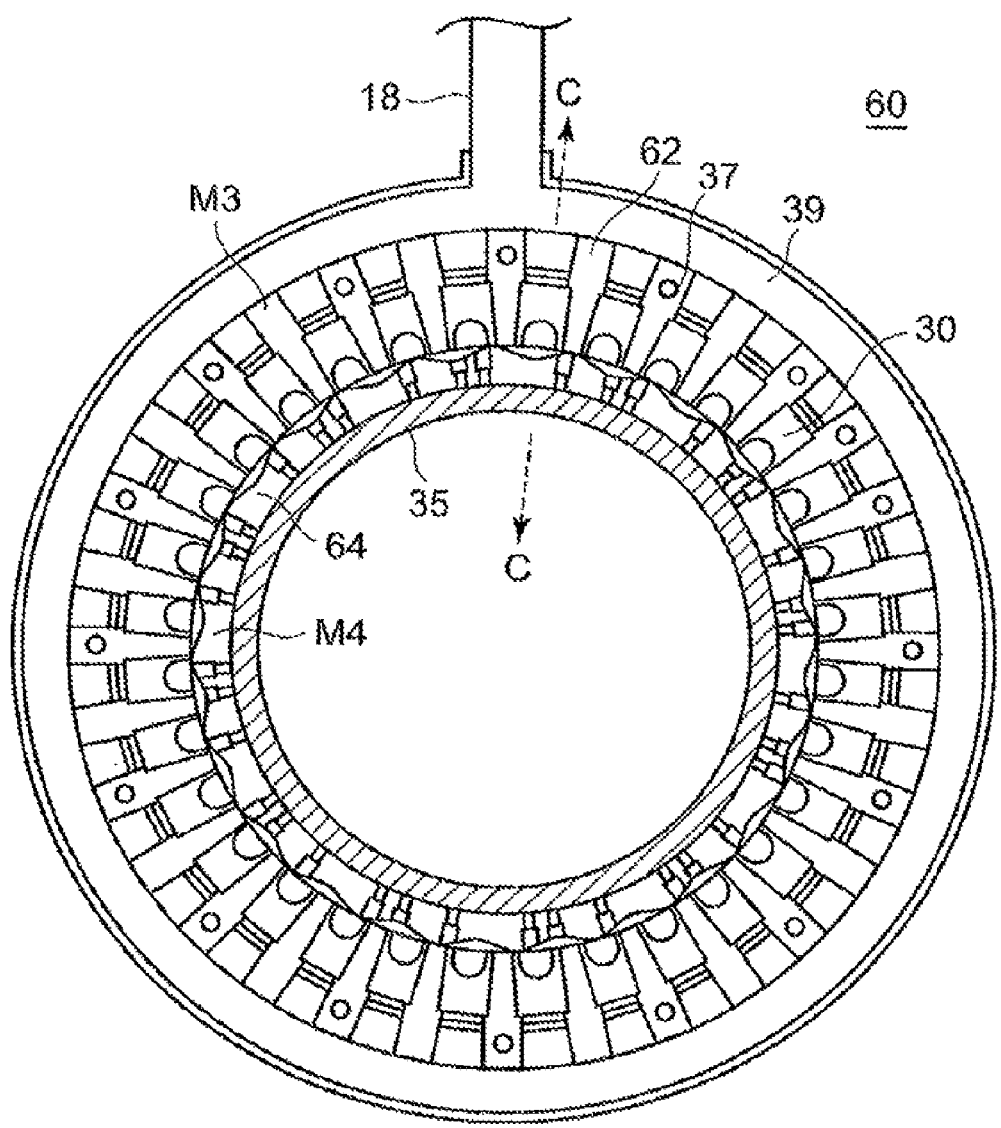
FIG. 8 is an illustration of another example of the hydraulic pump constituted of a plurality of modules.
Figure 9:
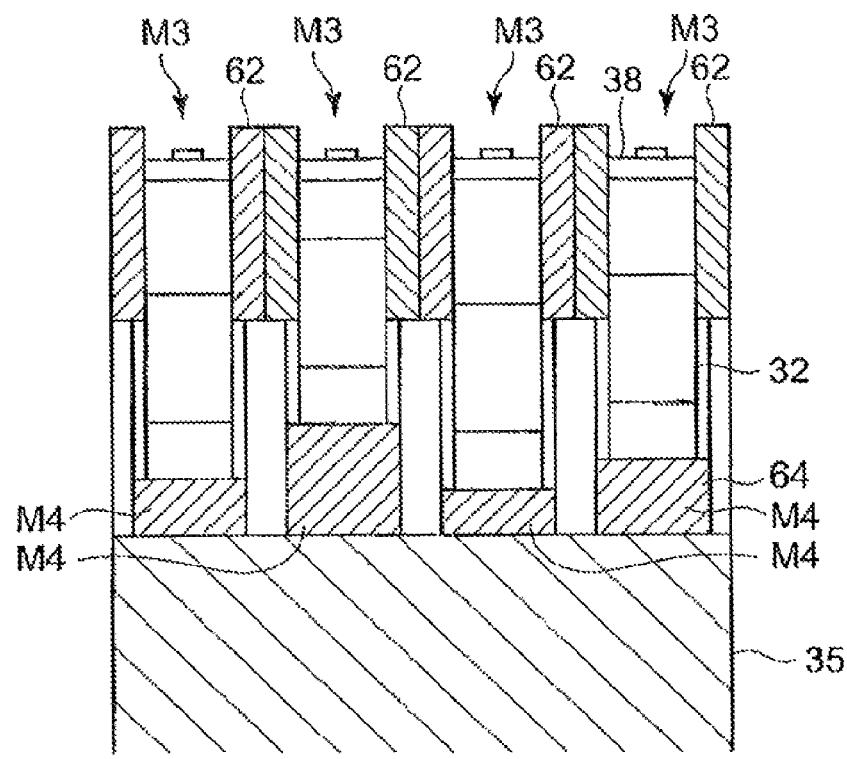
FIG. 9 is a sectional view taken along a line C-C of FIG. 8.

FIG. 8 is an illustration of another example of the hydraulic pump constituted of a plurality of modules that are different from the modules of FIG. 4 and FIG. 5. FIG. 9 is a sectional view taken along a line C-C of FIG. 8. In the hydraulic pump shown in FIG. 8 and FIG. 9, the components that are already explained in FIG. 4 to FIG. 7 have the same reference numerals and will not be explained further.

In the hydraulic pump 60 illustrated in FIG. 8 and FIG. 9, the cylinder block 62 is formed into an annular shape around the entire circumference of the main shaft in a continuous manner. The hydraulic pump 60 is constituted of a plurality of modules M3 arranged in the axial direction of the main shaft 8. Each of the modules M3 is composed of the cylinder block 62 of the annular shape, the piston 30, the high pressure valve 36 and the low pressure valve 38.

As FIG. 8 shows, the cam 64 of the hydraulic pump 60 has common features with the cam (ring cam) 34 of the hydraulic pump 12 of FIG. 5 except for the fact that the cam 64 is formed into an annular shape around the entire circumference of the main shaft 8 in the continuous manner. Specifically, the cam 64 is a annular ring cam that is formed around the entire circumference of the main shaft in the continuous manner, and not divided in the circumferential direction of the main shaft 8.

As illustrated in FIG. 9, the hydraulic pump 60 comprises a plurality of modules M4 arranged in the axial direction of the main shaft 8. Each of the modules M4 is constituted of the annular cam 64(ring cam) formed around the entire circumference of the main shaft 8. In this manner, a variety of wind turbine generators 1 can be efficiently produced by changing the number of the modules M4 (cam 64) arranged in the axial direction of the main shaft 8.

Further, as illustrated in FIG. 9, the cams 64 of the hydraulic pump 60 are displaced with respect with each other in view of reducing the vibration of the hydraulic pump 60.
(Hydraulic Transmission having a Plurality of Hydraulic Motors)

Figure 10:
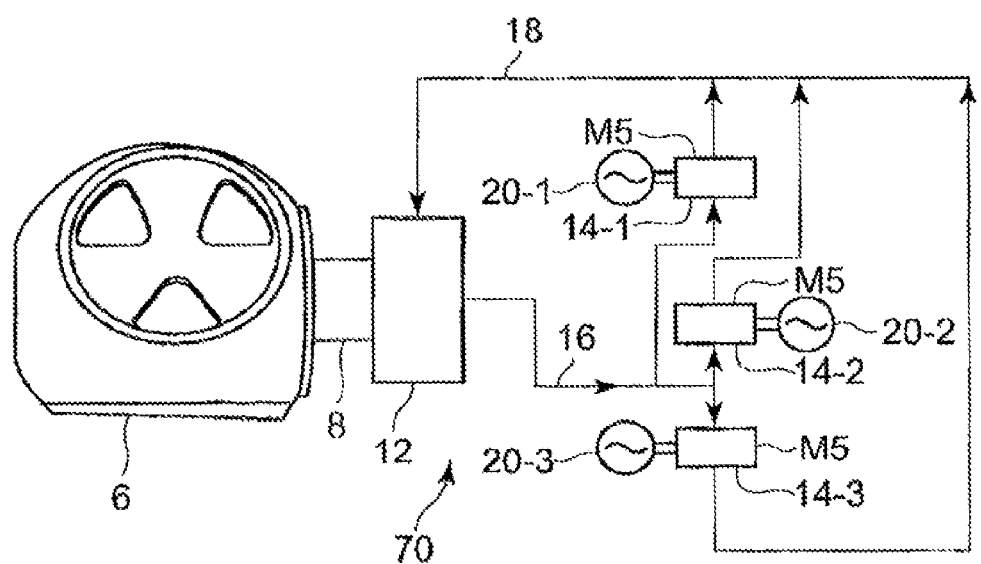
FIG. 10 is a diagram showing a hydraulic transmission having a plurality of hydraulic motors as modules.

FIG. 10 is a diagram showing a hydraulic transmission having a plurality of the hydraulic motors 14 as modules.

The hydraulic transmission 70 of FIG. 10 includes a plurality of modules M5, each of which is constituted of each of the hydraulic motors 14 (14-1, 14-2, 14-3). The high pressure oil line 16 whose one end is connected to the discharge side of the hydraulic pump 12, splits along the way to be connected to the intake side of each of the hydraulic motor 14. Meanwhile, the low pressure oil line 18 whose one end is connected to the discharge side of each of the hydraulic motor 14 are joined in the way and connected to the intake side of the hydraulic pump.

The plurality of the hydraulic motors 14 are provided as the modules M5. The high pressure oil line 16 and the low pressure oil line 18 are connected to each of the hydraulic motors 14 so as to output the rotation of the main shaft 8 to the output shafts of the plurality of hydraulic motors 14 (crankshaft 45 of FIG. 3). In this manner, by outputting the rotation of the main shaft to the plurality of hydraulic motors 14, the hydraulic motors 14 and the generator 20 (20-1, 20-2, 20-3) connected to the hydraulic motors 14 can be downsized, thereby achieving greater flexibility of location of the hydraulic motors 14 and the generator.

Further, when the plurality of the hydraulic motors 14 are installed, by simply changing the number of the modules M5, i.e. the hydraulic motors 14, a variety of wind turbine generators 1 with different outputs can be efficiently produced.
(Modularization oh Hydraulic Motor)

Figure 11:
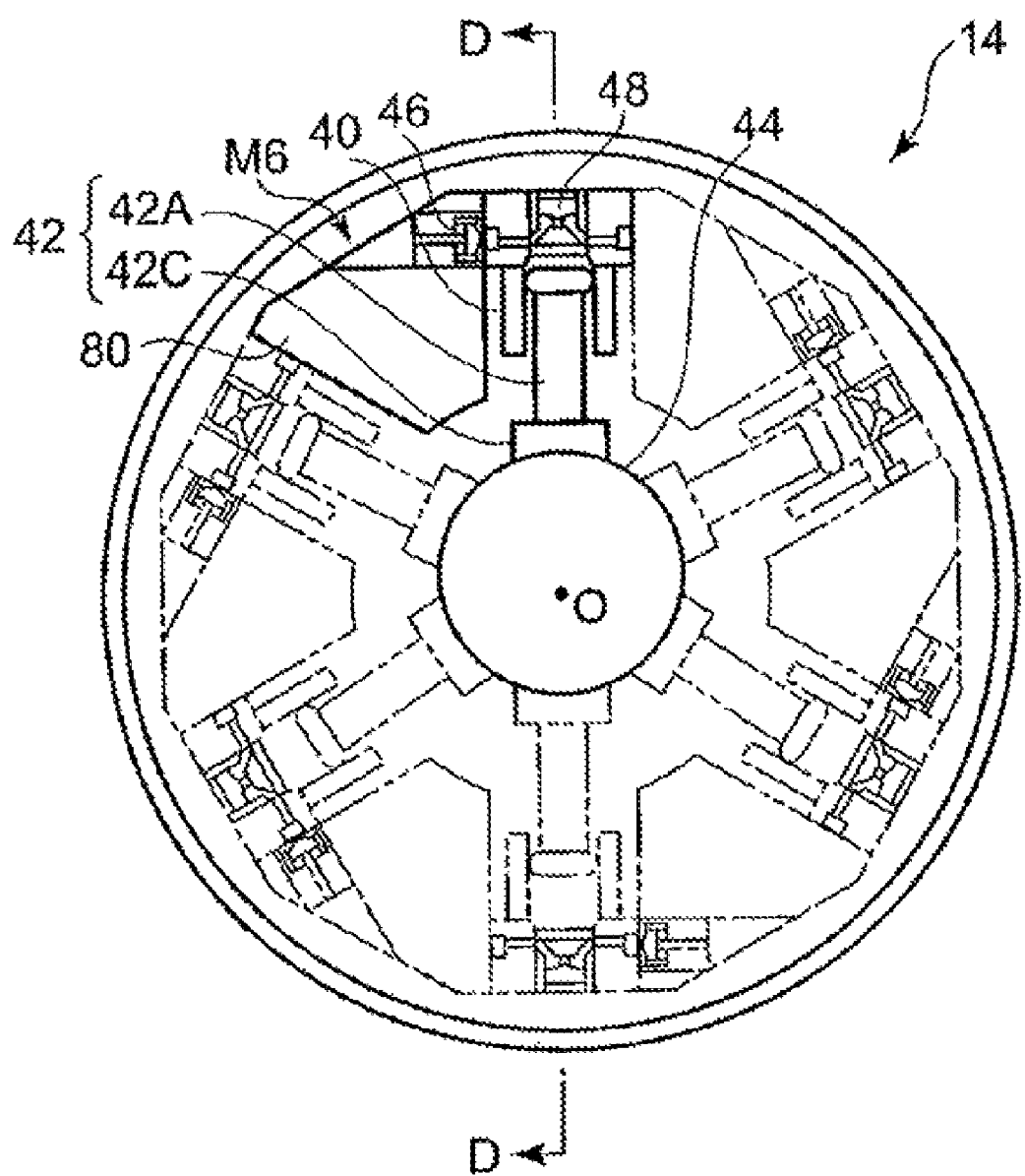
FIG. 11 is an illustration of an example of the hydraulic motor constituted of a plurality of modules.
Figure 12:
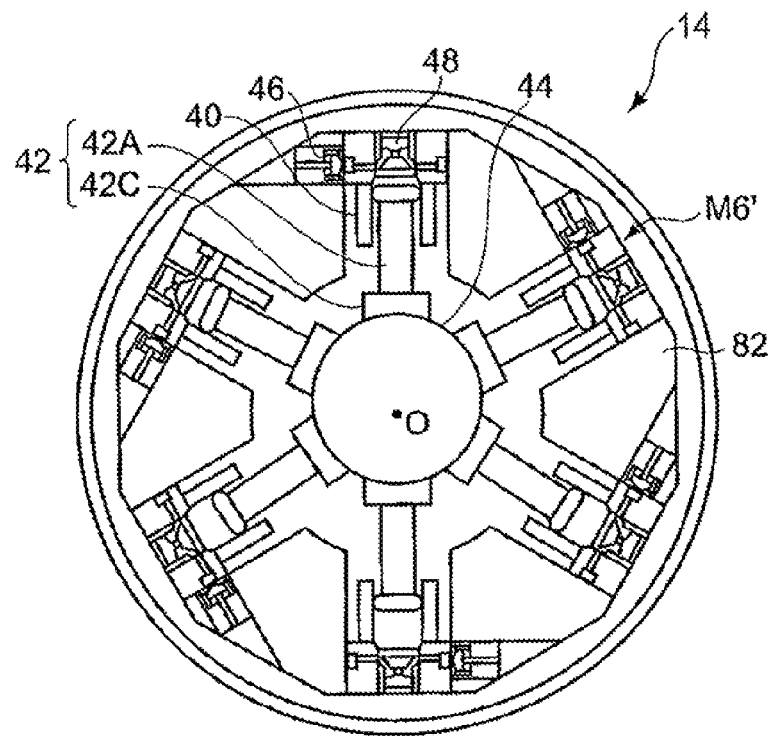
FIG. 12 is an illustration of another example of the hydraulic motor constituted of a plurality of modules.
Figure 13:
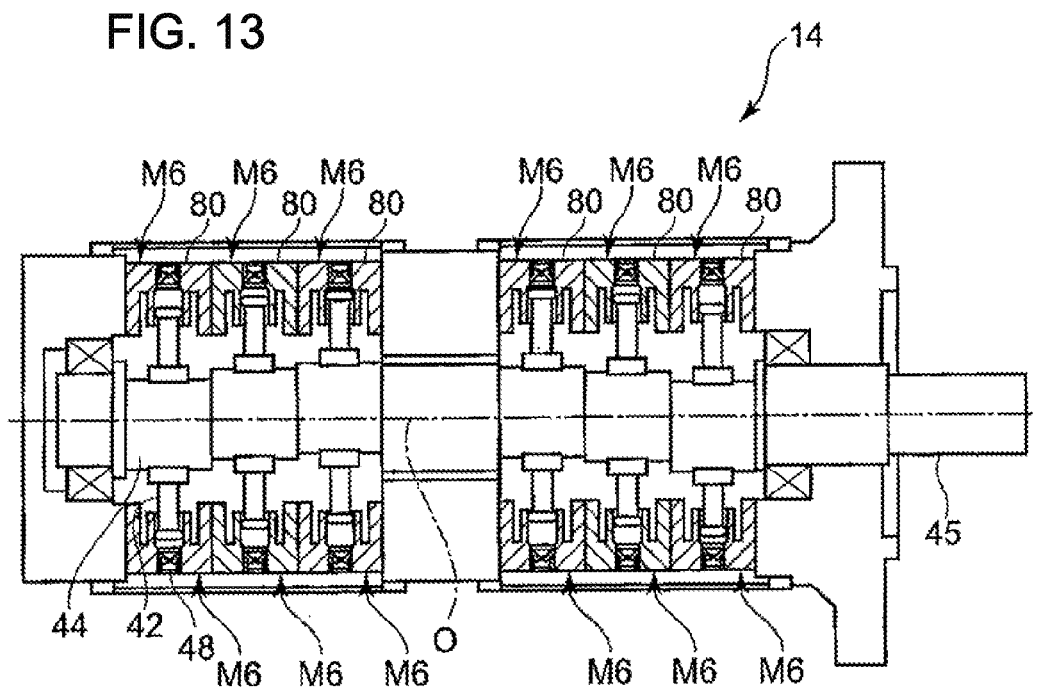
FIG. 13 is a sectional view taken along a line D-D of FIG. 11.

FIG. 11 is an illustration of another example of the hydraulic motor 14 constituted of a plurality of modules. FIG. 12 is an illustration of another example of the hydraulic motor 14 constituted of a plurality of modules. FIG. 13 is a sectional view taken along a line D-D of FIG. 11.

As shown in FIG. 11, the cam 44 of the hydraulic motor 14 is an eccentric cam that is disposed eccentrically with respect to a shaft center O of the crankshaft 45 (see FIG. 13) connected to the generator 20. In the hydraulic motor 14, provided is the cylinder block 80 formed around the cam 40. The cylinder block 80 comprises at least one cylinder 40, and a pair of the piston 42, the high pressure valve 46 and the low pressure valve 48 are provided for each of the cylinders 40. Further, the example illustrated in FIG. 11, the piston 42 includes a piston body 42A which moves slidingly in the cylinder 40, and a piston shoe 42C that is mounted on the piston body 42A and is in engagement with the cam surface of the cam 44.

As shown in FIG. 11, the hydraulic motor 14 is constituted of a plurality of the modules M6 arranged in a circumferential direction of the crankshaft 45. FIG. 11 shows an example structure having six modules M6. Each of the modules M6 is composed of the cylinder block 80 partially covering the cam surface of the cam 44 (the eccentric cam), the piston provide for each cylinder 40 of the cylinder block 80, the high pressure valve 46 and the low pressure valve 48 that are provided for each of the at least one cylinder of the cylinder block. FIG. 11 illustrates the case wherein the module M6 is composed of the cylinder block partially covering the cam surface of the cam (eccentric cam) 44 and the component group attached thereto. It is also possible as shown in FIG. 12 that a module M6' is composed of the cylinder block 82 disposed circumferentially around a center axis O of the crankshaft 45 in a continuous manner and the component group attached thereto such as the piston 42, the high pressure valve 46 and the low pressure valve 48.

In another example illustrated in FIG. 13, the hydraulic motor 14 is constituted of a plurality of rings arranged in the axial direction of the crankshaft 45. Each of rings is formed in a continuous manner by arranging the modules of FIG. 11 side by side in the circumferential direction of the crankshaft 45. It is also possible to use the modules M6' of FIG. 12 to form the ring. In such a case, each of the rings is formed in a continuous manner by arranging the modules M6' side by side in the circumferential direction of the crankshaft 45 and a plurality of the rings are disposed in the axial direction of the crankshaft 45.

In these cases, by changing the number of rings to be arranged in the axial direction of the crankshaft 45, a variety of wind turbine generators with different outputs can be produced efficiently.

From the perspective of reducing the vibration of the hydraulic motor, FIG. 13 shows an example wherein the plurality of the cams 44 of the hydraulic motor 14 are arranged in the axial direction of the crank shaft 45 such that phases of the cam surfaces of the cams 44 are displaced with respect to each other.

As described above in reference to FIG. 11 to FIG. 13, the hydraulic motor 14 is constituted of the module M6 or M6'. However, the configuration of the hydraulic motor 14 is not limited to the above examples and may be modified as follows.

Figure 14:
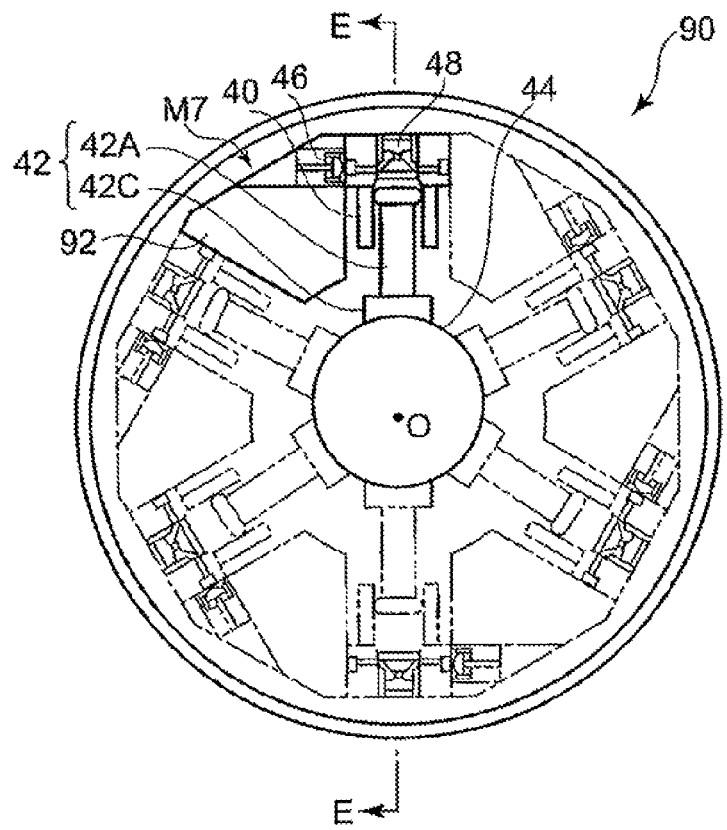
FIG. 14 is an illustration of another example of the hydraulic motor constituted of a plurality of modules.
Figure 15:
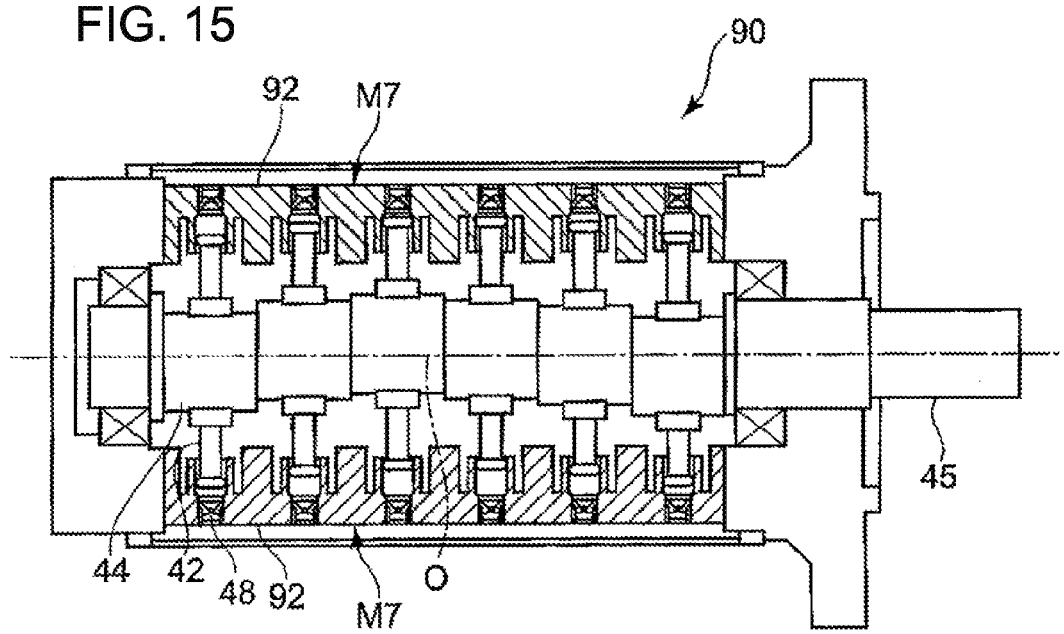
FIG. 15 is a sectional view taken along a line E-E of FIG. 14.

FIG. 14 is an illustration of another example of the hydraulic motor constituted of a plurality of modules. FIG. 15 is a sectional view taken along a line E-E of FIG. 14. In the hydraulic motor of FIG. 14 and FIG. 15, the same reference numbers are used for the same components as the hydraulic motor 14 of FIG. 11 to FIG. 13 and further explanation is omitted for the components.

As illustrated in FIG. 14 and FIG. 15, the cylinder block 92 of the hydraulic motor 90 partially covers the cam surfaces of the cam (eccentric cam) 44 and extends in the axial direction of the crankshaft 45.

In the hydraulic motor 90, a plurality of modules M7 are arranged in the circumferential direction of the crankshaft 45. Each of the modules M7 is composed of a cylinder block 92, a piston 42 provided for each cylinder 40 of the cylinder block 92, the high pressure valve 46 and the low pressure valve 48.

In this manner, each of the modules M7 is formed by the cylinder block 92 which partially covers the cam surface of the cam (eccentric cam) 44 and extends in the axial direction of the crankshaft and the component groups thereto. By changing the number of the modules M7 to be arranged side by side in the circumferential direction of the crankshaft 45, a variety of wind turbine generators with different output can be produced efficiently.

While the present invention has been described with reference to exemplary embodiments, it is obvious to those skilled in the art that various changes may be made without departing from the scope of the invention.

For instance, the preferred embodiment uses the exemplary case to which the present invention is applied to. But the present invention is also applicable to the tidal current generator. The tidal current generator refers to a generator which is installed in places such as sea, a river and a lake and utilizes tidal energy. The tidal current generator have the same structure as the wind turbine generator 1 except that the rotor 2 is rotated by the tidal current instead of the wind. The tidal current generator comprises the rotor 2 rotated by the tidal current, the hydraulic transmission 10 for increasing the rotation speed of the rotor 2 and the generator 20 for generating electric power. The same reference numbers are used here to explain the components that are common to the wind turbine generator 1.

Herein, the hydraulic transmission 10 of the tidal current generator is at least partially constituted of a plurality of modules (M1 to M7) and thus, the productivity and ease of maintenance of the tidal current generator is improved. Further, by changing the number of the modules (M1 to M7) of the hydraulic transmission 10 depending on the output, a variety of tidal current generators with different output can be produced efficiently.

REFERENCE SIGNS LIST 1 wind turbine generator
2 rotor
4 blade
6 hub
8 main shaft
9A main shaft bearing
9B main shaft bearing
10 hydraulic transmission
12 hydraulic pump
14 hydraulic motor
16 high pressure oil line
18 low pressure oil line
20 generator
22 nacelle
24 tower
26 base
30 cylinder
32 piston
32A piston body
32B piston roller
34 cam
35 cam mount
36 high pressure valve
37 high pressure communication path
38 low pressure valve
39 low pressure communication path
40 cylinder
42 piston
42A piston body
42B piston roller
42C piston shoe
44 cam
46 high pressure valve
47 high pressure communication path
48 low pressure valve
49 low pressure communication path
50 pump casing
50A end plate
50B end plate
50C cylindrical case
52 pump bearing
54 cylinder block
56 cylinder arrays
58 arc-shaped member
60 hydraulic pump
62 cylinder block
64 cam
70 hydraulic transmission
80 cylinder block
90 hydraulic motor
92 cylinder block
M1-M7 module

The invention claimed is:

1. A wind turbine generator or a tidal current generator comprising:
    a rotor;
    a generator for converting rotation energy transmitted from the rotor to electric power; and a hydraulic transmission for transmitting the rotation energy of the rotor to the generator, the hydraulic transmission including a hydraulic pump to be driven by the rotor and a hydraulic motor which is coupled to the generator, wherein the hydraulic pump includes a rotation shaft;

cylinders arranged radially around the rotation shaft;

a cylinder block formed with the cylinders;

pistons which are arranged slidably in the cylinders, respectively, each of the pistons forming a working chamber together with a corresponding one of the cylinders;

a cam arranged around the rotation shaft and configured to reciprocate the pistons inside the cylinders, respectively; and a high pressure communication path formed inside the cylinder block and extending in an axial direction of rotation shaft, and wherein the high pressure communication path is communicated with a group of the working chambers that are arranged across the high pressure communication path on both sides of the high pressure communication path to extract pressurized oil from the group of the working chambers outside the hydraulic pump.

2. The wind turbine generator or the tidal current generator according to claim 1, wherein the cylinder block is formed into a plurality of arch-shaped segments arranged radially around the rotation shaft, and wherein each of the arch-shaped segments is formed with the high pressure communication path and a pair of arrays of the cylinders which are linearly arranged along the high pressure communication path on said both sides of the high pressure communication path.

3. The wind turbine generator or the tidal current generator according to claim 1, wherein the hydraulic pump further includes a pump casing and a low pressure communication path which is an annular channel between the cylinder block and the pump casing, and wherein the low pressure communication path is communicated to the radially arranged working chambers through bores radially provided inside the cylinder block to lead oil to be pressurized into the radially arranged working chambers.

4. The wind turbine generator or the tidal current generator according to claim 1, wherein the hydraulic transmission further includes a high pressure oil line which is arranged between a discharge side of the hydraulic pump and an intake side of the hydraulic motor; and a low pressure oil line which is arranged between an intake side of the hydraulic pump and a discharge side of the hydraulic motor, wherein each of the hydraulic pump and the hydraulic motor includes:

a plurality of working chambers each of which is surrounded by a cylinder and a piston provided slidably in the cylinder;

a cam having a cam surface which is in engagement with the piston;

high pressure valves for opening and closing a high pressure communication path between each of the working chambers and the high pressure oil line; and low pressure valves for opening and closing a low pressure communication path between each of the working chambers and the low pressure oil line, and wherein the hydraulic transmission is at least partially constituted of a plurality of modules.

5. The wind turbine generator or the tidal current generator according to claim 4, wherein the cam of the hydraulic pump is a ring cam which has the cam surface defining a plurality of waves with concave portions and convex portions that are alternately disposed around the rotation shaft of the pump, wherein the ring cam has an annular shape and includes a plurality of modules arranged side by side in a circumferential direction of the rotation shaft of the pump, each of the modules being one of arc-shaped members into which the ring cam is divided in the circumferential direction of the rotation shaft of the pump.

6. The wind turbine generator or the tidal current generator according to claim 4, wherein the cam of the hydraulic pump is a ring cam which has the cam surface defining a plurality of waves with a plurality of concave portions and convex portions that are alternately disposed around the rotation shaft of the pump, the ring cam having an annular shape and being around the entire circumference of the rotation shaft of the pump in a continuous manner, and wherein the ring cam forms the module, and a plurality of the modules are arranged in the axial direction of the rotation shaft of the pump to form the hydraulic pump.

7. The wind turbine generator or the tidal current generator according to claim 4, wherein the cam of the hydraulic pump is a ring cam which is disposed circumferentially around the rotation shaft of the pump and has the cam surface defining a plurality of waves with a plurality of concave portions and convex portions that are alternately disposed around the rotation shaft of the pump, and wherein a plurality of the ring cams are arranged in the axial direction of the rotation shaft of the pump such that phases of the cam surfaces of the ring cams are displaced with respect to each other.

8. The wind turbine generator or the tidal current generator according to claim 4, wherein the cam of the hydraulic motor includes a plurality of eccentric cams that are disposed eccentrically with respect to a shaft center of a crank shaft coupled to the generator, and the plurality of the eccentric cams are arranged in an axial direction of the crank shaft such that phases of the cam surfaces of the eccentric cams are displaced with respect to each other.

9. The wind turbine generator or the tidal current generator according to claim 4, wherein the hydraulic pump comprises the plurality of the modules, each of the modules including a cylinder block which has at least one cylinder, the piston, the high pressure valve and the low pressure valve that are provided for each of the at least one cylinder of the cylinder block.

10. The wind turbine generator or the tidal current generator according to claim 9, wherein the piston of the hydraulic pump includes a piston body which is slidingly moveable in the cylinder, and a piston roller or a piston shoe that is mounted on the piston body and is in engagement with the cam surface of the cam.

11. The wind turbine generator or the tidal current generator according to claim 9, wherein the cylinder block of the hydraulic pump has an annular shape around the entire circumference of the rotation shaft of the pump in a continuous manner, and wherein the hydraulic pump includes a plurality of modules that are arranged in the axial direction of the rotation shaft of the pump, each of the modules including the cylinder block of the annular shape, the piston, the high pressure valve and the low pressure valve that are provided for each of the cylinders of the cylinder block.

12. The wind turbine generator or the tidal current generator according to claim 4, wherein the hydraulic transmission includes a plurality of the hydraulic motors each of which forms the module.

13. The wind turbine generator or the tidal current generator according to claim 12, wherein a plurality of sets of the hydraulic motor and the generator forming the module are provided in the wind turbine generator.

14. The wind turbine generator or the tidal current generator according to claim 4,
wherein the cam of the hydraulic motor is an eccentric cam that is disposed eccentrically with respect to a shaft center of a crank shaft coupled to the generator, and
wherein the hydraulic motor includes a plurality of the modules arranged in an axial direction of the crank shaft, each of the modules including the cylinder block that has at least one cylinder, the piston, the high pressure valve and the low pressure valve that are provided for each of the at least one cylinder of the cylinder block, the cylinder block being disposed circumferentially around a center axis of the crankshaft in a continuous manner.

15. The wind turbine generator or the tidal current generator according to claim 14,
wherein the piston of the hydraulic motor includes a piston body which is slidingly movable in the cylinder, and a piston roller or a piston shoe that is mounted on the piston body and is in engagement with the cam surface of the cam.

16. The wind turbine generator or the tidal current generator according to claim 4,
wherein the cam of the hydraulic motor includes an eccentric cam that is disposed eccentrically with respect to a shaft center of a crank shaft connected to the generator,
wherein the hydraulic motor includes a plurality of the modules arranged in a circumferential direction of the crank shaft, each of the modules including a cylinder block that has at least one cylinder and partially covering the cam surface of the eccentric cam, the piston, the high pressure valve and the low pressure valve that are provided for each of the at least one cylinder of the cylinder block.

17. The wind turbine generator or the tidal current generator according to claim 16,
wherein the piston of the hydraulic motor includes a piston body which is slidingly movable in the cylinder, and a piston roller or a piston shoe that is mounted on the piston body and is in engagement with the cam surface of the cam.

* * * * *